US012725876B2

(12) United States Patent
Jeong et al.

(10) Patent No.: US 12,725,876 B2
(45) Date of Patent: Sep. 1, 2026

(54) BATTERY PACK HOUSING AND BATTERY PACK INCLUDING THE SAME

(71) Applicant: SK ON CO., LTD., Seoul (KR)

(72) Inventors: Won Seok Jeong, Daejeon (KR); Shan Shan Jin, Daejeon (KR); Hae Ryong Jeon, Daejeon (KR)

(73) Assignee: SK On Co., Ltd., Seoul (KR)

( * ) Notice: Subject to any disclaimer, the term of this patent is extended or adjusted under 35 U.S.C. 154(b) by 610 days.

(21) Appl. No.: 18/331,176

(22) Filed: Jun. 8, 2023

(65) Prior Publication Data

US 2024/0178505 A1 May 30, 2024

(30) Foreign Application Priority Data

Nov. 29, 2022 (KR) ........................ 10-2022-0163146

(51) Int. Cl.

| | |
|---|---|
| ***H01M 50/291*** | (2021.01) |
| ***H01M 10/052*** | (2010.01) |
| ***H01M 50/24*** | (2021.01) |
| ***H01M 50/293*** | (2021.01) |

(52) U.S. Cl.

CPC ....... *H01M 50/291* (2021.01); *H01M 10/052* (2013.01); *H01M 50/24* (2021.01); *H01M 50/293* (2021.01)

(58) Field of Classification Search

CPC .. H01M 50/291; H01M 10/052; H01M 50/24; H01M 50/293; H01M 50/3425; H01M 2200/00; H01M 50/227; H01M 50/367; H01M 50/375; H01M 50/204; H01M 50/244; H01M 50/209; H01M 50/233; H01M 50/249; H01M 50/358; Y02E 60/10

See application file for complete search history.

(56) References Cited

U.S. PATENT DOCUMENTS

2020/0067156 A1* 2/2020 Chi ..................... H01M 10/625

FOREIGN PATENT DOCUMENTS

| | | | | |
|---|---|---|---|---|
| CN | 115020900 A * | 9/2022 | .......... | H01M 50/249 |
| EP | 3570364 A1 | 11/2019 | | |
| JP | 2009-004362 A | 1/2009 | | |
| KR | 10-2019-0075486 A | 7/2019 | | |
| KR | 10-2021-0108442 A | 9/2021 | | |
| WO | WO-2022012450 A1 * | 1/2022 | ............... | A62C 3/07 |

OTHER PUBLICATIONS

Englsih translation of CN-115020900-A (Year: 2022).*
English translation of WO-2022012450-A1 (Year: 2022).*
Extended European Search Report for the European Patent Application No. 23185930.7 issued by the European Patent Office on Apr. 29, 2024.

* cited by examiner

*Primary Examiner* — Ula C Ruddock
*Assistant Examiner* — Sarika Gupta
(74) *Attorney, Agent, or Firm* — IP & T GROUP LLP

(57) ABSTRACT

A battery pack housing according to an embodiment of the present disclosure includes: a base portion; a side beam formed on an outer circumference of the base portion; and an accommodating portion defined as an internal space surrounded by the base portion and the side beam, wherein at least a portion of one or more of the side beam and the base portion includes a frame of a hollow structure and a thermally deformable material filled inside the frame.

15 Claims, 6 Drawing Sheets

BATTERY PACK HOUSING AND BATTERY PACK INCLUDING THE SAME

CROSS-REFERENCE TO RELATED APPLICATION

The present application claims priority under 35 U.S.C. § 119(a) to Korean patent application number 10-2022-0163146 filed on Nov. 29, 2022, in the Korean Intellectual Property Office, the entire disclosure of which is incorporated by reference herein.

BACKGROUND

1. Technical Field

Embodiments of the present disclosure relate to a battery pack housing and a battery pack including the same.

2. Related Art

With development of the electronics, communications, and space industries, demands for lithium secondary batteries as an energy power source are rapidly increasing. In particular, as the importance of global eco-friendly policies is emphasized, the electric vehicle market is growing rapidly, and research and development on the lithium secondary batteries are actively carried out at home and abroad.

The lithium secondary battery includes a cathode, an anode, and a separator disposed therebetween, and the cathode and the anode are provided with active materials capable of insertion and extraction of lithium ions, respectively.

A battery pack housing of a battery pack in which battery cells such as lithium secondary batteries are accommodated is formed of a hollow structure in which the inside of the pack housing frame is hollow so that it may be used as a flow passage of gas generated during combustion of the battery cells. However, there is an issue in that this type of battery pack housing is structurally fragile, and accordingly, a new type of battery pack housing is required.

SUMMARY

Embodiments of the present disclosure provide a battery pack housing with reinforced rigidity and a battery pack including the same.

In accordance with an aspect of the present disclosure, there is proved a battery pack housing including a base portion; a side beam formed on an outer circumference of the base portion; and an accommodating portion defined as an internal space surrounded by the base portion and the side beam, wherein at least a portion of one or more of the side beam and the base portion may include a frame of a hollow structure and a thermally deformable material filled inside the frame.

In accordance with an aspect of the present disclosure, there is proved a battery pack including one or more battery cell assemblies; and a battery pack housing in which the battery cell assemblies are disposed, wherein at least a portion of the battery pack housing may include a frame of a hollow structure and a thermally deformable material filled inside the frame.

According to the present disclosure, there are provided a battery pack housing with reinforced rigidity while securing a venting passage of a gas generated during combustion of a battery cell, and a battery pack including the same.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The specific structural or functional description disclosed herein is merely illustrative for the purpose of describing embodiments according to the concept of the present disclosure. The embodiments according to the concept of the present disclosure may be implemented in various forms in addition to the embodiments disclosed in this specification or application. In addition, the technical idea of the present disclosure is not construed as limited to the embodiments disclosed in this specification or application.

Figure 1:
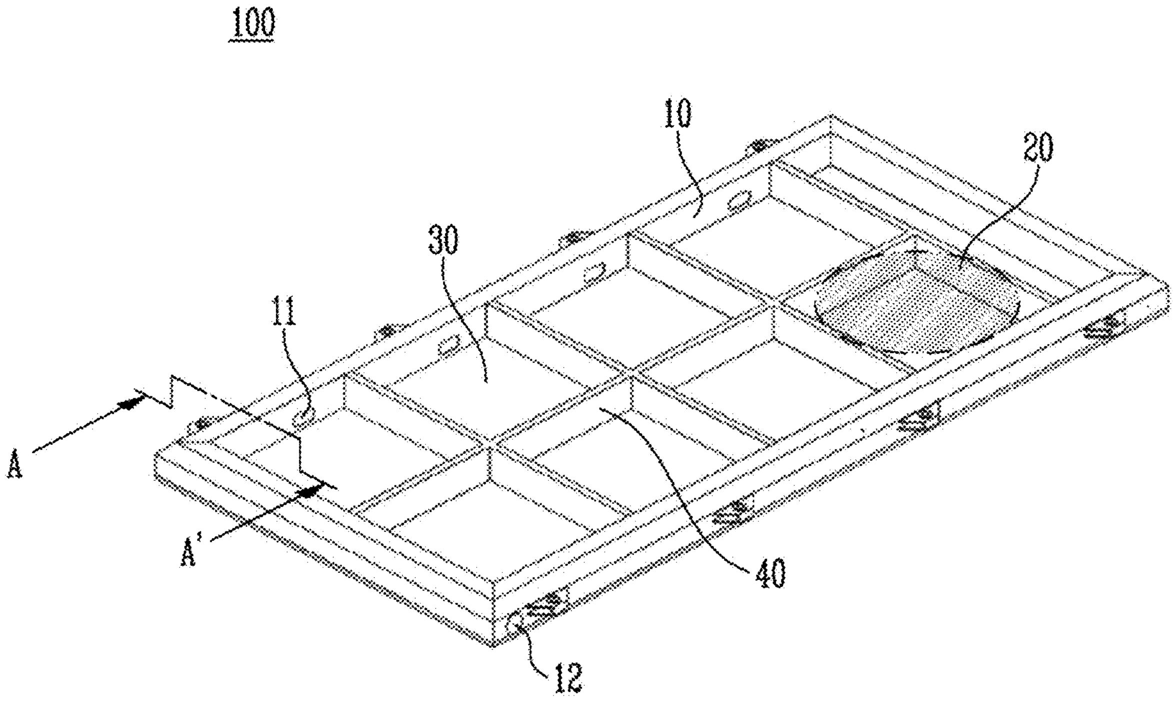
FIG. 1 is a diagram for illustrating a battery pack housing in accordance with an embodiment of the present disclosure.

FIG. 1 is a diagram for illustrating a battery pack housing in accordance with an embodiment of the present disclosure.

Referring to FIG. 1, a battery pack housing 100 may include a base portion 30 and a side beam 10. The side beam 10 may be formed on an outer circumference of the base portion 30. In addition, an internal space surrounded by the base portion 30 and the side beam 10 may be defined as an accommodating portion 20. One or more battery cell assemblies may be disposed in the accommodating portion 20. In FIG. 1, the accommodating portion 20 is shown as referring to only one region of regions divided by a partition wall 40, but may refer to the entire internal space surrounded by the side beam 10 and the base portion 30.

In one embodiment, the side beam 10 may include one or more first communication holes 11 communicating with the accommodating portion 20. In addition, in one embodiment, the side beam 10 may include one or more second communication holes 12 communicating with the outside of the battery pack housing 100. In an embodiment, when a high temperature gas is generated from a battery cell disposed in the accommodating portion 20, the gas may move into the side beam 10 through the first communication holes 11. The gas may be discharged to the outside through the second communication holes 12 by moving along the side beam 10.

In one embodiment, the battery pack housing 100 may further include the partition wall 40. The partition wall 40 may divide the accommodating portion 20 into a plurality of regions. One or more battery cell assemblies may be disposed in each of the plurality of regions.

In an embodiment, an inside of the partition wall 40 may communicate with an inside of the side beam 10. The high temperature gas flowing into the inside of the side beam 10 through the first communication holes 11 of the side beam 10 may move along the side beam 10 and the partition wall 40.

In an embodiment, at least a portion of the battery pack housing 100 may include a frame of a hollow structure and a thermally deformable material filled inside the frame. In one embodiment, at least a portion of the side beam 10 may include a frame of a hollow structure and a thermally deformable material filled inside the frame. In one embodiment, at least a portion of the partition wall 40 may include a frame of a hollow structure and a thermally deformable material filled inside the frame. For example, the entirety of the side beam 10 and the partition wall 40 may be configured as form including a frame of a hollow structure and a thermally deformable material filled inside the frame, but is not limited thereto. In a portion thereof, there may be only the frame of the hollow structure, and in other portion, there may be the frame of the hollow structure and the thermally deformable material filled inside the frame. For example, the entirety of the side beam 10 and the partition wall 40 may be composed of a frame of a hollow structure, but the thermally deformable material may be selectively filled inside the frame only in a portion that requires rigidity reinforcement. As another example, a portion of the side beam 10 and the partition wall 40 that does not form a passage of the gas may be composed of a frame of which inside is filled rather than the hollow structure, and only a portion that forms the passage of the gas may be composed of the frame of the hollow structure. In addition, the thermally deformable material may be filled in a portion that requires rigidity reinforcement among portions made of the frame of the hollow structure. The frame and the thermally deformable material of the battery pack housing 100 will be described in more detail in FIGS. 3 and 4 below.

Figure 2:
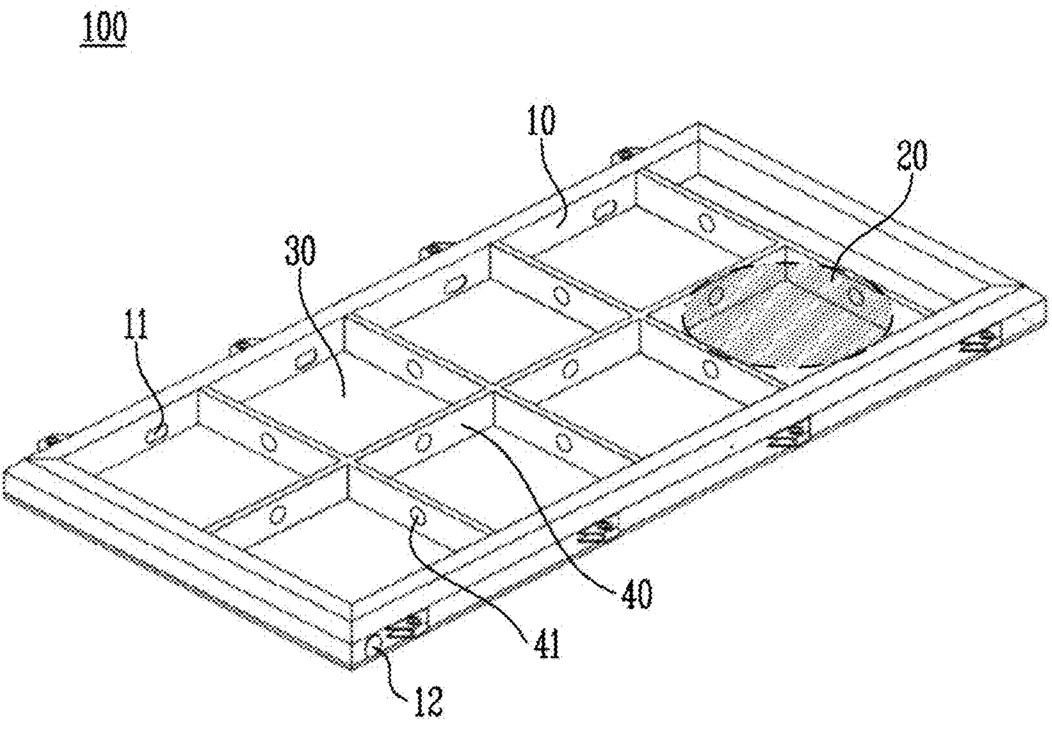
FIG. 2 is a diagram for illustrating a battery pack housing in accordance with another embodiment of the present disclosure.

FIG. 2 is a diagram for illustrating a battery pack housing in accordance with another embodiment of the present disclosure.

FIG. 2 may illustrate a battery pack housing 100 substantially the same as FIG. 1, except for an embodiment of the partition wall 40. Referring to FIG. 2, the partition wall 40 may include one or more first communication holes 41 communicating with the accommodating portion 20. The first communication holes 41 of the partition wall 40 may have the same function as the first communication holes 11 of the side beam 10. In other words, when a high temperature gas is generated from the battery cell disposed in the accommodating portion 20, the gas may move into the partition wall 40 through the first communication holes 41 of the partition wall 40, and the gas may move along the partition wall 40 and the side beam 10. The gas moving along the partition wall 40 and the side beam 10 may be discharged outside the battery pack housing through the second communication holes 12 of the side beam 10.

In FIG. 2, the first communication holes 11 and 41 are illustrated to be formed in both the partition wall 40 and the side beam 10, but are not limited thereto. In another embodiment, there are no first communication holes in the side beam 10, and the first communication holes 41 may be present only in the partition wall 40.

Figure 3:
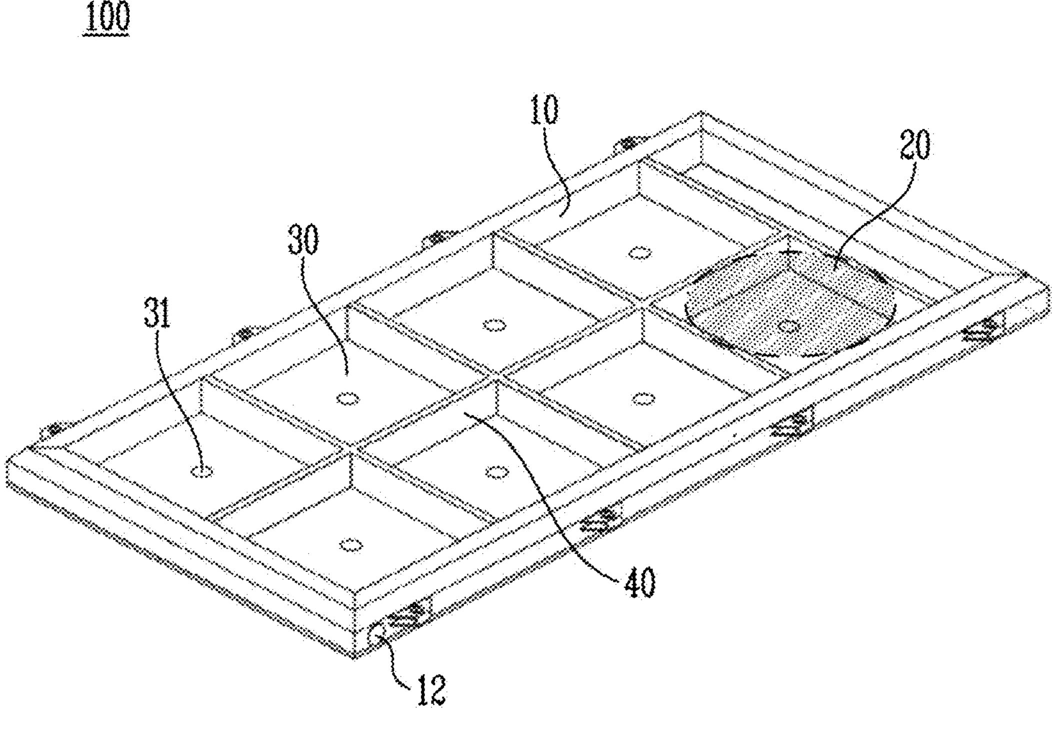
FIG. 3 is a diagram for illustrating a battery pack housing in accordance with another embodiment of the present disclosure.

FIG. 3 is a diagram for illustrating a battery pack housing in accordance with another embodiment of the present disclosure.

Referring to FIG. 3, the base portion 30 may include one or more first communication holes 31 communicating with the accommodating portion 20. In one embodiment, when a high temperature gas is generated from the battery cell disposed in the accommodating portion 20, the high temperature gas may move into the base portion 30 through the first communication hole 31 of the base portion 30. In an embodiment, the inside of the base portion 30 may communicate with the inside of the side beam 10 and/or the inside of the partition wall 40, and at least a portion of the base portion 30 may include the frame of the hollow structure and the thermally deformable material filled inside the frame. Accordingly, when the high temperature gas is generated from the battery cell disposed in the accommodating portion 20, the high temperature gas may flow into the base portion 30 through the first communication holes 31 of the base portion 30, and then may be discharged to the outside through the base portion 30, the side beam 10 and/or the partition wall 40.

In FIG. 3, the first communication holes 31 is shown to be formed only in the base portion 30, but is not limited thereto. In another embodiment, in addition to the base portion 30, the first communication holes may be further present in the side beam 10 or the partition wall 40.

Further, although not shown in FIG. 3, in one embodiment, the base portion 30 may include one or more second communication holes (not shown) communicating with the outside of the battery. If the base portion 30 includes one or more second communication holes (not shown) communicating with the outside of the battery, the high temperature gas may be discharged to the outside through the second communication holes (not shown) of the base portion 30.

In other words, summing up FIGS. 1 to 3, in an embodiment, the first communication holes may be included in one or more of the side beam 10, the base portion 30, and the partition wall 40. In addition, the second communication holes may be included in one or more of the side beam 10 and the base portion 30.

In addition, in an embodiment, at least some of the side beam 10, the base portion 30, and the partition wall 40 may communicate with each other. Accordingly, the high temperature gas generated from battery cell assemblies disposed in the accommodating portion 20 may move along the inside of at least a portion of the side beam 10, the base portion 30, and the partition wall 40. In an embodiment, the high temperature gas may flow into the inside of the battery pack housing 100 through the first communication holes included in one or more of the side beam 10, the base portion 30, and the partition wall 40, the inflowing high temperature gas may move along the inside of the battery pack housing 100 communicating with each other, and the high temperature gas may be discharged to the outside of the battery pack through the second communication holes included in one or more of the side beam 10 and the base portion 30. Here, at least a portion of the battery pack housing 100, more specifically, at least a portion of the side beam 10, the base portion 30, and the partition wall 40 may include the frame of the hollow structure and the thermally deformable material filled inside the frame. The inside of the battery pack housing 100 having this structure may provide the passage through which the high temperature gas may move at or above the predetermined temperature. The inside of the battery pack housing 100 will be described in more detail in FIGS. 4, 5A and 5B below.

In one embodiment, the first communication holes may be formed in all of the side beam 10, the base portion 30, and the partition wall 40. In another embodiment, the second communication holes may be formed in both the side beam 10 and the base portion 30. By adjusting the number and positions of the first and second communication holes as described above, it may become easier to discharge the high temperature gas.

In one embodiment, the entire of the side beam 10, the base portion 30, and the partition wall 40 may be configured in a form including the frame of the hollow structure and the thermally deformable material filled inside the frame. In another embodiment, only the frame of the hollow structure may exist in a portion of the side beam 10, the base portion 30, and the partition wall 40, and the frame of the hollow structure and the thermally deformable material filled inside the frame may exist in other portion. By adjusting the position and volume of the area where the thermally deformable material exists, the gas tightness and mechanical properties of the battery pack housing 100 may be improved and at the same time fully function as the gas passage.

Figure 4:
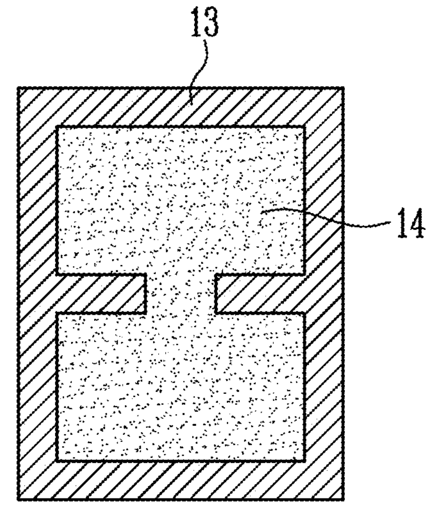
FIG. 4 is a diagram for illustrating a cross-section of a battery pack housing at or below a predetermined temperature in accordance with an embodiment of the present disclosure.

FIG. 4 is a diagram for illustrating a cross-section of a battery pack housing at or below a predetermined temperature in accordance with an embodiment of the present disclosure.

Figure 5A:
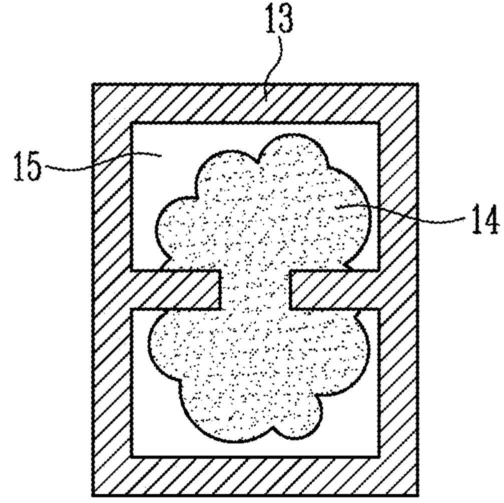
FIGS. 5A and 5B are diagrams for illustrating a cross-section of a battery pack housing at or above a predetermined temperature in accordance with an embodiment of the present disclosure.
Figure 5B:
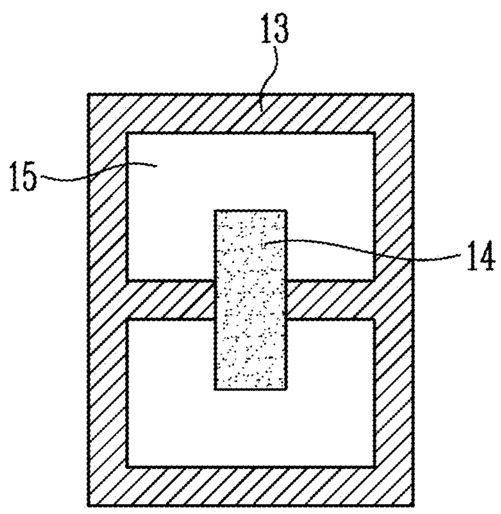

FIGS. 5A and 5B are diagrams for illustrating a cross-section of the battery pack housing at or above the predetermined temperature in accordance with an embodiment of the present disclosure.

FIGS. 4, 5A, and 5B illustrate the A-A' cross-section of FIG. 1, and may be one cross-section of the side beam 10 included in the battery pack housing 100, but is not limited thereto. It may be a cross-section of the partition wall 40, and may be a cross-section of the base portion 30.

Referring to FIGS. 4, 5A, and 5B, at least a portion of the battery pack housing 100 at or below the predetermined temperature, for example, at least a portion of the side beam 10, may include the frame 13 and the thermally deformable material 14.

In an embodiment, the frame 13 may be formed of metal, but is not limited thereto. In an embodiment, at least a portion of the frame 13 may have the hollow structure.

At or below the predetermined temperature, the thermally deformable material 14 may be filled inside the frame 13 of the hollow structure as shown in FIG. 4. Accordingly, the thermally deformable material 14 may reinforce the rigidity of the frame 13. In addition, the thermally deformable material 14 may prevent infiltration of foreign substances and moisture from the outside of the battery pack housing 100.

The thermally deformable material 14 may be a material whose shape changes at or above the predetermined temperature. In an embodiment, as the shape of the thermally deformable material 14 changes at or above the predetermined temperature, an empty space 15 may be formed between the frame 13 and the thermally deformable material 14 as shown in FIG. 5A. In one embodiment, the thermally deformable material 14 may be a material whose volume decreases at or above the predetermined temperature as shown in FIG. 5B. For example, the thermally deformable material 14 may be a flammable material that burns at or above the predetermined temperature. The flammable material, for example, may be one or more selected from the group consisting of polyurethane foam, polyethylene and polypropylene. However, the thermally deformable material 14 is not limited to the above-described materials, and any material changing its shape at or above the predetermined temperature such that the empty space 15 may be formed between the frame 13 and the thermally deformable material 14 may be used without limitation. For example, if a thermoplastic resin, a thermocombustible resin, a shape memory alloy, or the like may be deformed at or above the predetermined temperature to form the empty space 15 inside the frame 13, it may be used as the thermally deformable material 14. The empty space 15 may function as the passage of the gas.

Here, the predetermined temperature may refer to a Heat Deflection Temperature (HDT) of the thermally deformable material 14, and may be, for example, a temperature of 200° C. to 400° C., and preferably a temperature of 250° C. to 380° C. In other words, it may be a temperature at which an event such as combustion occurs in the battery cell or a temperature higher than that, and it may be a temperature within a range that may prevent thermal runaway. For example, when the thermally deformable material 14 is a flammable material, the flash point, which is the temperature at which the flammable material is combusted, may be within the range described above.

Accordingly, before the event such as combustion occurs in the battery cell, the thermally deformable material 14 may be filled inside the hollow frame 13 to reinforce the frame 13, thereby reinforcing the rigidity of the battery pack housing 100. If the event such as combustion occurs in the battery cell and the high temperature gas is generated, deformation occurs in the thermally deformable material 14 due to the high temperature, thereby forming the empty space 15 that functions as the gas passage in the frame 13. The high temperature gas generated from the battery cell may move through the empty space 15, and the high temperature gas may be discharged outside the battery pack housing through the second communication holes communicating with the outside of the battery pack housing.

Figure 6:
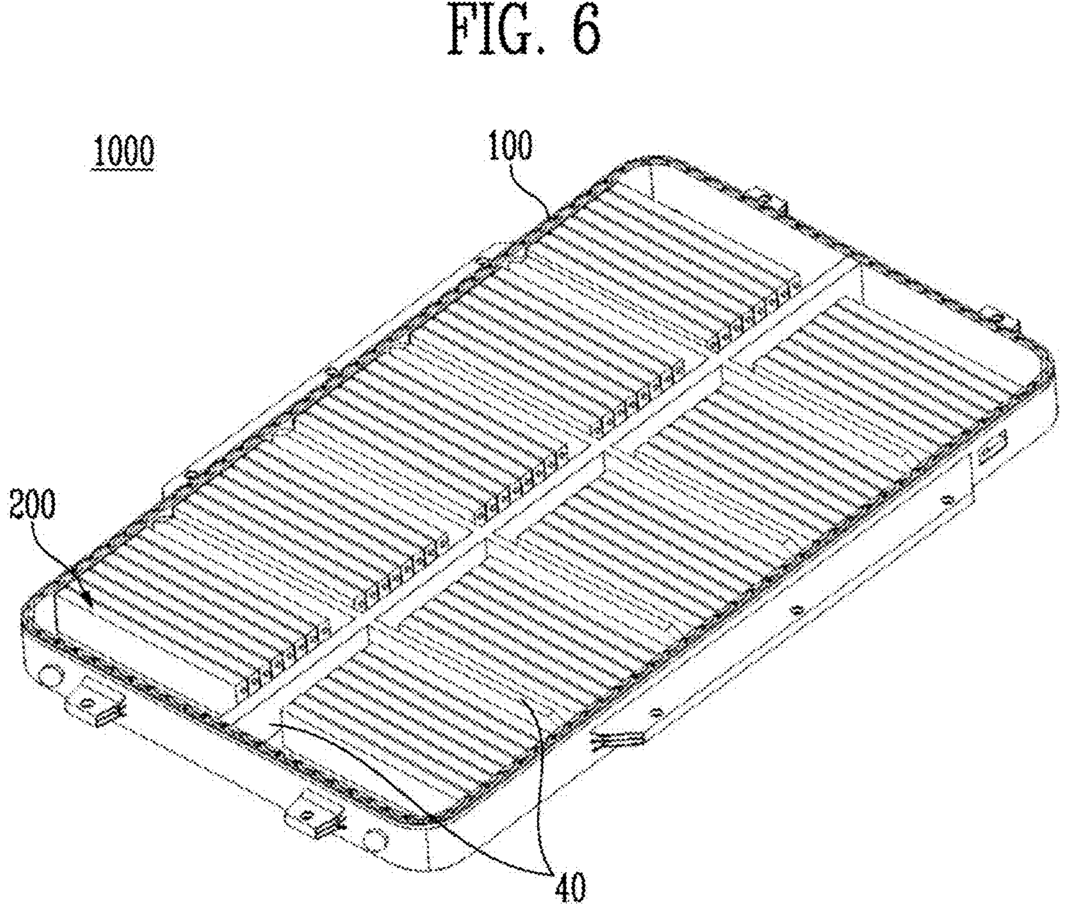
FIG. 6 is a diagram for illustrating a battery pack in accordance with an embodiment of the present disclosure.

FIG. 6 is a diagram for illustrating a battery pack in accordance with an embodiment of the present disclosure.

Referring to FIG. 6, a battery pack 1000 may include the battery pack housing 100 and a battery cell assembly 200.

The battery pack housing 100 is the same as described in FIGS. 1 to 4, and is not described repeatedly. The description of the battery pack housing 100 in FIGS. 1 to 4 may be applied to the battery pack housing 100 of FIG. 6.

The battery cell assembly 200 may be disposed in the battery pack housing 100. More specifically, it may be accommodated in the accommodating portion of the battery pack housing 100.

In an embodiment, the battery cell assembly 200 may include one or more battery cells. The battery cell may include one or more electrode assemblies for secondary batteries. The electrode assembly for the secondary battery may include a plurality of anode plates, a plurality of cathode plates, and a separator.

Each of the cathode plate and the anode plate may include a current collector and an active material layer disposed on the current collector. For example, the cathode plate may include a cathode current collector and a cathode active material layer, and the anode plate may include an anode current collector and an anode active material layer.

The current collector may include a known conductive material in a range that does not cause a chemical reaction in the lithium secondary battery.

The active material layer may include an active material. For example, the cathode active material layer may include a cathode active material, and the anode active material layer may include an anode active material.

The cathode active material may be a material in which lithium (Li) ions may be inserted and extracted, and the anode active material may be a material in which lithium ions may be absorbed and extracted.

Each of the cathode plate and the anode plate may further include a binder and a conductive material. The binder may mediate bond between the current collector and the active material layer, thereby improving mechanical stability.

The separator may be disposed between the cathode plate and the anode plate, and the separator may be configured to prevent an electrical short circuit between the cathode plate and the anode plate, and to generate the flow of ions.

In an embodiment, the battery cell may be a pouched type secondary battery or a can type secondary battery having a prismatic or circular shape, and in the case of the pouched type secondary battery, it may be a pouched type secondary battery having a three-sided sealing structure or a pouched type secondary battery having a four-sided sealing structure. However, it is not limited to a specific type of a secondary battery.

The battery cell assembly 200 may include an electrolyte provided with the battery cells. The electrolyte may be a non-aqueous electrolyte. The electrolyte may include lithium salts and organic solvents.

In one embodiment, the battery cell assembly 200 may refer to a cell stack itself in which a plurality of battery cells are stacked. In another embodiment, the battery cell assembly 200 may refer to a battery module having a module case in which the cell stack in which the plurality of battery cells are stacked is accommodated.

One or more battery cell assemblies 200 may be disposed in the battery pack housing 100. For example, as shown in FIG. 6, the accommodating portion of the battery pack housing 100 may be divided into a plurality of regions based on the partition wall 40. One or more battery cell assemblies 200 may be disposed in each of the regions.

In an embodiment, a predetermined interval may be maintained between the battery cell assembly 200 and the side beam of the battery pack housing 100. The high temperature gas generated from the battery cell assembly 200 may move inside the battery pack housing 100 through the first communication holes formed in the battery pack housing 100, may move along a path in the battery pack housing 100, and eventually may be discharged to the outside of the battery pack 1000 through the second communication holes formed in the battery pack housing 100. In this case, at least some of the passages in the battery pack housing 100 may include the above-described thermally deformable material, and a passage through which the gas may move may be formed by changing the shape of the thermally deformable material by the high temperature gas.

In one embodiment, when the battery cell assembly 200 is in the form of the battery module, the module case of the battery cell assembly 200 may include venting holes (not shown) through which the high temperature gas generated from the battery cells is discharged to the outside of the cell assembly 200. In this case, the venting holes of the battery cell assembly 200 may face the first communication holes of the battery pack housing 100 so that the gas discharged from the battery cell assembly 200 may easily move to the outside of the battery pack 1000. For example, when the first communication holes are formed in the side beam of the battery pack housing 100, the venting holes of the battery pack housing 100 may be located in a direction that may face the first communication holes of the side beam. Alternatively, when the first communication holes are formed in the partition wall of the battery pack housing 100, the venting holes of the battery pack housing 100 may be located in a direction that may face the first communication holes of the partition wall. Alternatively, when the first communication holes are formed in the base portion of the battery pack housing 100, the venting holes of the battery pack housing 100 may be located in a direction that may face the first communication holes of the base portion of the battery pack housing 100.

In an embodiment, the battery pack 1000 may further include a cover (not shown). The cover (not shown) may cover an upper portion of the battery pack housing 100 in which the battery cell assemblies 200 are disposed, thereby sealing the battery cell assemblies 200.

In one embodiment, the battery pack 1000 may further include a cooling member (not shown). The cooling member (not shown) may be in contact with at least a portion of the battery pack housing 100. The cooling member (not shown) may be configured to allow cooling fluid to flow to cool the battery cell assemblies 200 in the battery pack 1000.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the exemplary embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed:

1. A battery pack housing comprising:

a base portion;

a side beam formed on an outer circumference of the base portion; and an accommodating portion defined as an internal space surrounded by the base portion and the side beam, wherein at least a portion of one or more of the side beam and the base portion comprises a frame of a hollow structure and a thermally deformable material filled inside the frame, wherein the side beam comprises one or more first communication holes communicating with the accommodating portion, and one or more second communication holes communicating with an outside of the battery pack housing, and wherein gas generated from a battery accommodated in the accommodating portion is configured to be discharged from the accommodating portion to the outside through the one or more first communication holes and the one or more second communication holes.

2. The battery pack housing of claim 1, wherein the thermally deformable material changes its shape at or above a predetermined temperature.

3. The battery pack housing of claim 2, wherein an empty space is formed between the frame and the thermally deformable material at or above the predetermined temperature.

4. The battery pack housing of claim 3, wherein the thermally deformable material is a flammable material that burns at or above the predetermined temperature.

5. The battery pack housing of claim 4, wherein the thermally deformable material comprises one or more selected from the group consisting of polyurethane foam, polyethylene, and polypropylene.

6. The battery pack housing of claim 2, wherein the predetermined temperature is a temperature of 200° C. to 400° C.

7. The battery pack housing of claim 1, wherein the base portion comprises one or more first communication holes communicating with the accommodating portion.

8. The battery pack housing of claim 1, further comprising one or more partition walls dividing the accommodating portion into a plurality of regions.

9. The battery pack housing of claim 8, wherein an inside of the partition walls communicates with an inside of the side beam.

10. The battery pack housing of claim 9, wherein the partition walls comprise one or more first communication holes communicating with the accommodating portion.

11. The battery pack housing of claim 3, wherein the empty space functions as a gas passage.

12. A battery pack comprising:

one or more battery cell assemblies, each comprising one or more battery cells; and a battery pack housing in which the battery cell assemblies are disposed, wherein at least a portion of the battery pack housing comprises a frame of a hollow structure and a thermally deformable material filled inside the frame, wherein the battery pack housing comprises: a base portion; a side beam formed on an outer circumference of the base portion; and an accommodating portion which is defined as an internal space surrounded by the base portion and the side beam and accommodates the battery cell assemblies, wherein one or more of the side beam and the base portion comprise one or more first communication holes communicating with the accommodating portion, and one or more second communication holes communicating with an outside of the battery pack, and wherein gas generated from battery cells accommodated in the accommodating portion is configured to be discharged from the accommodating portion to the outside through the one or more first communication holes and the one or more second communication holes.

13. The battery pack of claim 12, wherein the side beam comprises the frame of the hollow structure and the thermally deformable material filled inside the frame.

14. The battery pack of claim 12, wherein the battery pack housing further comprises one or more partition walls dividing the accommodating portion into a plurality of regions in which the battery cell assemblies are disposed.

15. The battery pack of claim 14, wherein an inside of the partition walls communicates with an inside of the side beam.

* * * * *